US009695670B2

United States Patent
Ayo et al.

(10) Patent No.: US 9,695,670 B2
(45) Date of Patent: Jul. 4, 2017

(54) DIRECT SLURRY WEIGHT SENSOR FOR WELL OPERATION MIXING PROCESS

(71) Applicant: Weatherford/Lamb, Inc., Houston, TX (US)

(72) Inventors: Grant W. Ayo, Magnolia, TX (US); Billy Williams, Longview, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 0 days.

(21) Appl. No.: 14/212,672

(22) Filed: Mar. 14, 2014

(65) Prior Publication Data

US 2014/0269144 A1     Sep. 18, 2014

Related U.S. Application Data

(60) Provisional application No. 61/794,150, filed on Mar. 15, 2013.

(51) Int. Cl.
| | | |
|---|---|---|
| *E21B 33/13* | (2006.01) | |
| *G05D 21/02* | (2006.01) | |
| *B01F 5/10* | (2006.01) | |
| *B01F 5/20* | (2006.01) | |
| *B01F 15/00* | (2006.01) | |

(Continued)

(52) U.S. Cl.
CPC ............ *E21B 33/13* (2013.01); *B01F 3/1221* (2013.01); *B01F 5/106* (2013.01); *B01F 5/205* (2013.01); *B01F 15/00233* (2013.01); *B01F 15/0408* (2013.01); *B01F 15/0429* (2013.01); *G05D 21/02* (2013.01); *B01F 2003/1285* (2013.01)

(58) Field of Classification Search
CPC .... B01F 5/10; B01F 5/106; B01F 2003/1285; E21B 33/13

USPC .................................................. 366/136, 137
See application file for complete search history.

(56) References Cited

U.S. PATENT DOCUMENTS

| | | |
|---|---|---|
| 3,591,147 A | 7/1971 | Anderson |
| 4,764,019 A | 8/1988 | Kaminski |

(Continued)

FOREIGN PATENT DOCUMENTS

GB         2219105 A     11/1989

OTHER PUBLICATIONS

International Search Report and Written Opinion received in corresponding PCT Application PCT/US2014/028514, dated Jun. 13, 2014.

(Continued)

*Primary Examiner* — Tony G Soohoo
*Assistant Examiner* — Anshu Bhatia
(74) *Attorney, Agent, or Firm* — Blank Rome LLP

(57) ABSTRACT

A slurry mixing system calculates a density of a slurry using measured pressure differential and based on a bulk velocity of the slurry. Slurry from mixing of dry blend and mix fluid enters a one or more tanks having agitators. A pump then pumps the slurry from the tank(s) to the well, and a portion of the slurry is recirculating back to a mixer. From the recirculated path, a direct slurry weight sensor measures a pressure differential of the slurry between two vertical measurement points of a known volume. The sensor can measure a velocity of the recirculated slurry, or the recirculated slurry can be maintained at a velocity. Based on these measures, the controller calculates a density of the slurry, monitors a ratio of the dry blend and the mix fluid, and adjusts the ratio based on the calculated density of the slurry if there is a discrepancy.

27 Claims, 3 Drawing Sheets

(51) Int. Cl.
*B01F 15/04* (2006.01)
*B01F 3/12* (2006.01)

(56) References Cited

U.S. PATENT DOCUMENTS

| | | |
|---|---|---|
| 5,571,281 A | 11/1996 | Allen |
| 5,892,860 A | 4/1999 | Maron et al. |
| 6,354,147 B1 | 3/2002 | Gysling et al. |
| 6,463,813 B1 | 10/2002 | Gysling et al. |
| 6,749,330 B2 | 6/2004 | Allen |
| 6,786,629 B2 | 9/2004 | Rondeau et al. |
| 7,281,415 B2 | 10/2007 | Johansen |
| 7,600,414 B2 | 10/2009 | Allen |

OTHER PUBLICATIONS

"Oil & Gas: Micro Motion Density Meters Replace Nuclear Devices to Control Well-Cementing Properties," Micro Motion, Emerson Process Management, obtained from www.EmersonProcess.com/solutions/oilgas and www.micromotion.com, brochure No. AN-001178 (c) 2009 Micro Motion, Inc., 2 pages.

Schlumberger, "Cementing Services and Products: Equipment," obtained from www.slb.com, 12 pages.

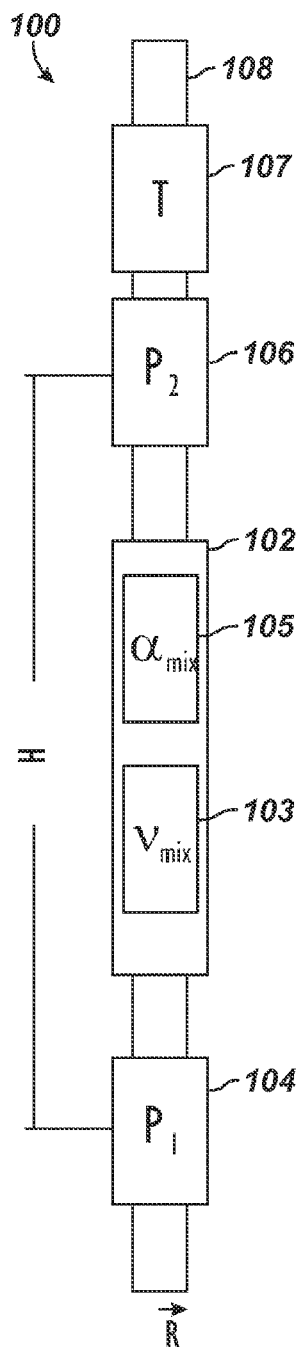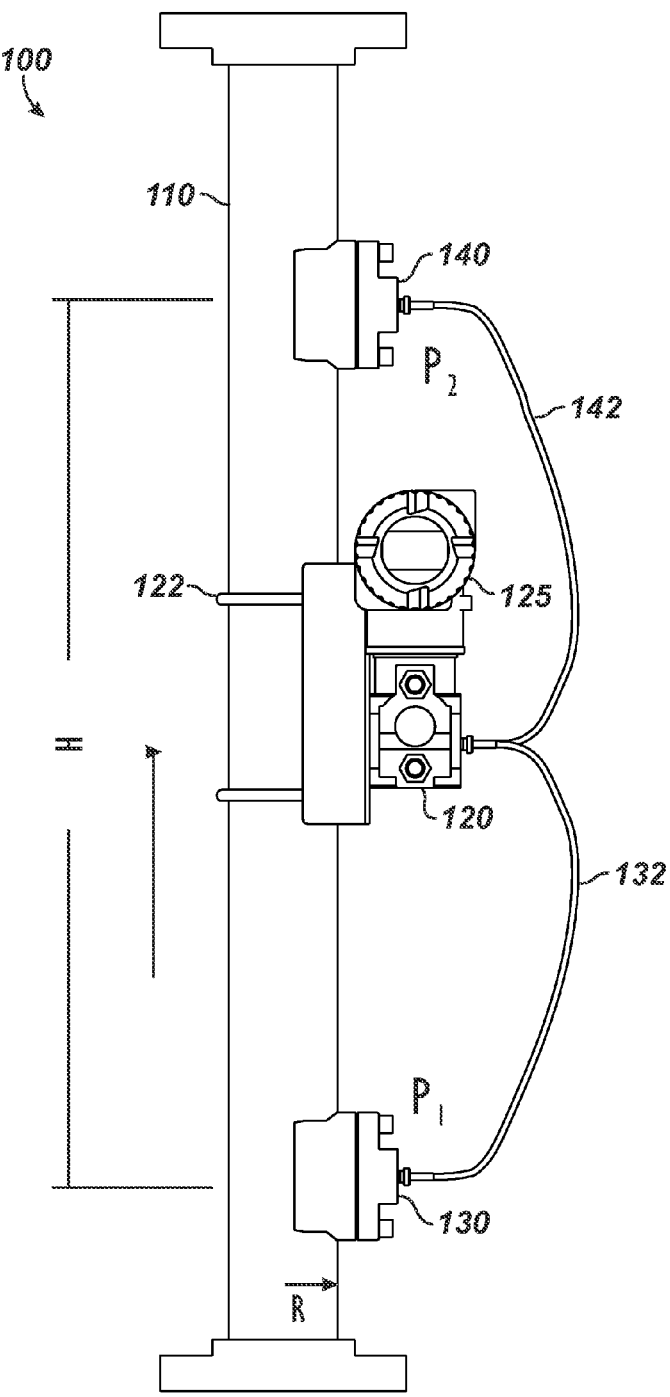
FIG. 3
FIG. 4

DIRECT SLURRY WEIGHT SENSOR FOR WELL OPERATION MIXING PROCESS

CROSS-REFERENCE TO RELATED APPLICATIONS

This application claims the benefit of U.S. Provisional Appl. 61/794,150, filed 15 Mar. 2013, which is incorporated herein by reference in its entirety.

BACKGROUND

A number of industries use the flow of a slurry to achieve various purposes. In the oil well industry, for example, a mixed slurry of cement and water can be pumped downhole to support casing and isolation zones of a formation. Operators can use many types of cement mixers for these cement jobs, and the mixer can be designed to handle the particulars of the slurry to be produced, including water levels, additives, etc. Some typical mixers include jet-type mixers, vortex mixers, and continuous recirculation mixers. In other oil well applications, operators can pump a slurry of treatment fluid downhole to treat or frac the formation in the borehole. The slurry of treatment fluid can contain rock salt, wax beads, proppant (e.g., sand, ceramic beads, etc.), benzoic acid flakes, foam-based fluids, gelled and ungelled aqueous-based fluids, or other kind of material used for treating or fracing a formation. These applications can also use a mixer.

Successful cementing, fracing, and other slurry applications rely a great deal on how the slurry is mixed and pumped for its purposes. Therefore, a fundamental aspect of these operations involves knowing and controlling the density of the slurry. (For reference, cement slurry densities can range anywhere from about 7 lbm/gal [840 kg/m$^3$] to about 23 lbm/gal [2760 kg/m$^3$].)

In particular, oil well cementing operations require a particular density that may need to change during the cementing operation as different depths, downhole pressures, temperatures, and formations call for slurries of different densities. Depending on the application, the density of the slurry may also need to be maintained within tight tolerance and may need to change quickly during the operation. Moreover, the desired slurry may have a particular complexity that proves hard to achieve. For example, thixotropic slurries with very low "free water" requirements may be needed for deep, high temperature-high pressure gas wells. Therefore, the density of the slurry needs constant monitoring and control at the wellsite during the cementing operation.

Although several technologies exist in the art for measuring density of a slurry, current technologies used in mixing cement or fracing slurries may not accurately measure the density of the complex cement or fracing slurry. As one example, sensing technologies can measure density using coriolis sensing or nuclear sensing. Thus, one type of sensor used in measuring slurries is a nuclear densitometer. Because it uses a nuclear source, the nuclear densitometer imposes significant costs and restrictions on the movement of the equipment, and special permits and handling are required.

Even though the nuclear densitometer can be accurate, operators can use a coriolis sensor instead. Unfortunately, coriolis technology loses accuracy as more air is entrained or as particles of significantly different specific gravity are utilized together in the slurry. Additionally, a nuclear densitometer also loses accuracy as more air is entrained and is dependent on characterizing the absorption of each slurry material mix used.

Rather than using such sensors, an alternative approach in the industry measures fluid rates on the input and output sides and monitors the tub level to remain constant. This approach then back calculates the solids in the slurry by determining the volumetric difference of the slurry discharge rate and the base fluid supply rate. Historically, either the density is interpolated, or several mathematical assumptions are made to calculate density based on average flow rate.

The subject matter of the present disclosure is directed to overcoming, or at least reducing the effects of, one or more of the problems set forth above.

SUMMARY

A direct slurry weight sensor, system, and method calculates a density of a slurry using a measured pressure differential and a bulk velocity of the slurry. Dry blend, such as cement or fracing material, is delivered to a mixer, which then mixes a mix fluid, such as water, with the dry blend. The resulting slurry enters a mixing tank having an agitator to agitate the slurry. An averaging tank with an agitator may also be used. Eventually, a pump pumps the slurry from the tank(s) to the well, and a portion of the slurry is recirculating back to the mixer for wetting the dry blend and mixing with the dry blend and mix water.

A vertical conduit or pipe extends from the recirculated path of the slurry and has a direct slurry weight sensor for measuring properties of the recirculated slurry. In particular, the sensor measures a pressure differential of the slurry between at least two vertical measurement points of a known volume along the vertical conduit. The sensor also measures a velocity of the recirculated slurry. Based on these measures, the controller calculates a density of the slurry.

As the mixing continues, a required density of the slurry must be maintained and/or changed for the application at hand. For example, too much mix water in a cement slurry reduces the strength of the cement when it sets, and voids may form in the cement column. Too little mix water in the cement slurry increases the viscosity to the detriment of pumping, and voids of dry cement may be present in the cement column.

Accordingly, the controller monitors a ratio of the dry blend and the mix fluid delivered to the mixer and adjusts the ratio if there is a discrepancy between the calculated density and the required density for the application at hand. To monitor the ratio, the system can have a dry blend sensor for measuring the dry blend delivered to the mixer and can have a fluid sensor for measuring the mix fluid delivered to the mixer. To measure bulk velocity of the slurry, the sensor has a velocity sensor.

To measure the pressure differential, the system can have separate pressure sensors sensing separate pressures at separate vertical locations of the known volume on the vertical conduit. Either one or both of these pressure sensors can have a sensing element for sensing pressure, a diaphragm in communication with the known volume, and a capillary communicating the sensing element with the diaphragm.

Measuring fluid velocity and phase measurements are not the direct intention of the system. Instead, the system seeks to minimize the gas phase by measuring under an applied pressure to the process fluid. The system then makes the velocity measurement unnecessary by minimizing the distance between the sensor locations and maintaining a constant velocity through the sensor. The constant velocity can be maintained by a dedicated pump feeding fluid to the density loop. On a cementing unit, there is a boost pump and a recirculation pump that feeds the mixer. The system can add a density recirculation pump.

The foregoing summary is not intended to summarize each potential embodiment or every aspect of the present disclosure.

BRIEF DESCRIPTION OF THE DRAWINGS

FIG. 3 schematically illustrates a direct slurry weight sensor of the present disclosure.

FIG. 4 illustrates an embodiment of the direct slurry weight sensor of the present disclosure.

DETAILED DESCRIPTION

Figure 1:
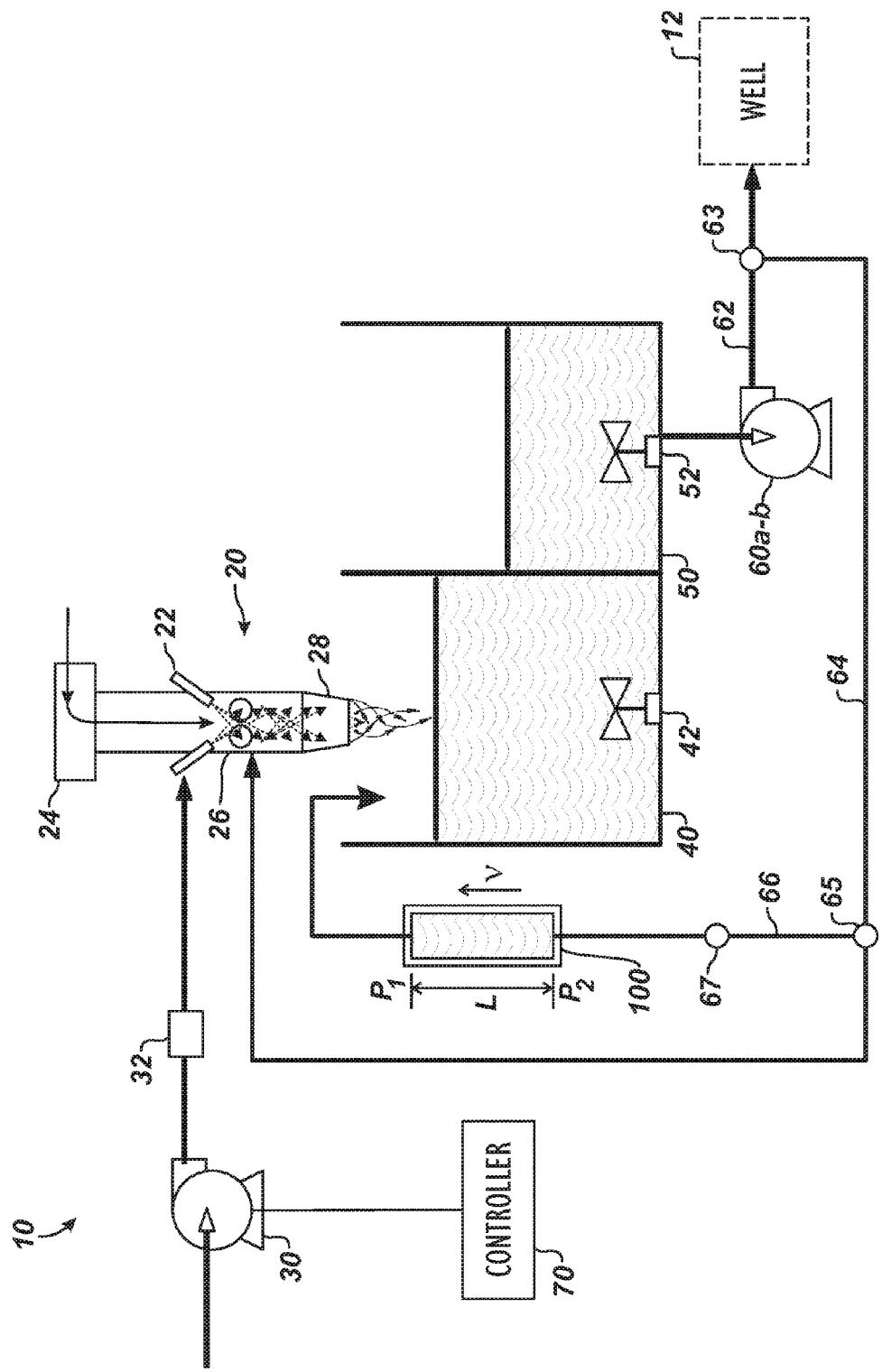
FIG. 1 illustrates a mixing system according to the present disclosure.

A mixing system 10 in FIG. 1 delivers slurry for an operation in a well 12. In this example, the mixing system 10 delivers a cement slurry for a cementing operation in the well 12, but the teachings of the present disclosure can apply equally well to other forms of slurring mixing, such as mixing slurries for fracing or downhole treatment. Many of the components of the system 10 can be incorporated into a cementing skid or mixing truck, such as commonly used at wellsites.

In the cementing operation shown, the system 10 pneumatically feeds bulk dry blend to an input of a recirculating jet mixer 20 and uses a metering valve 24 or the like to control the delivery of the dry blend into the mixer 20. At the same time, the system 10 pumps mix fluid with a pump 30 into the mixer 20, and a turbine flow meter 32 or the like measures the delivery of the mix fluid. For cementing, the dry blend includes bulk dry cement and any additives, such as loss circulation materials and weighting materials, while the mix fluid is generally water. Other operations would use other materials.

At the mixer 20, jets 22 spray the mix water at high pressure into the mixer 20 to mix with the bulk dry cement delivered pneumatically into the mixer 20. Additionally, a steady stream of recirculated cement also enters the jet mixer 20 through a port 26. This recirculated cement mixes with the freshly mixed slurry of water and cement and helps wet the dry cement. The resulting cement slurry exits the mixer 20 into a diffuser 28 and drops into a mix tank 40, which has an agitator 42. The diffuser 28 can be a passive centrifugal air separator that helps separate the bulk air used to convey the bulk cement and diffuses the energy of the slurry entering the mix tank 40. As is known, air entrained in the slurry can make accurate density measurements difficult.

From the mix tank 40, the slurry can flow to an averaging tank 50, which also has an agitator 52. There is a boost pump 60a and a recirculation pump 60b. The boost pump 60a connected from the tank 50 directs the slurry to the well 12 via a discharge conduit 62 for a high pressure pump, such as a triplex positive displacement pump or the like. Output from the recirculation pump 60b diverts back to the mixer 20 through a recirculation conduit 64. Diversion into the recirculation conduit 64 can be controlled by a valve 63.

Further, a direct slurry weight sensor 100 is positioned within a vertical conduit 66 extending from this recirculation conduit 64. Diversion into this conduit 66 can also be controlled by a valve 65. Slurry exits from this vertical conduit 66 into the mix tank 40.

As noted below, a controller 70 uses readings from the direct slurry weight sensor 100 to achieve a proper density at that particular time during the cementing operation. The controller 70 has control electronics (i.e., microprocessor, memory, user interface panel, etc.) and communicatively couples with the various meters, valves, and sensors of the system 10 to automatically control the mixing operations. Thus, the controller 70 connects to the sensors 32, 100, and others, although these connections may not be shown in FIG. 1.

As the system 10 operates, the controller 70 controls the resulting density of the cement slurry being discharged by the pump 60 at particular times during the mixing process to meet the needs for the cementing operation. Accordingly, the controller 70 can be preprogrammed or automatically controlled with the appropriate density and time data for the cementing process.

To control the resulting density of the cement slurry, the controller 70 uses signals from the slurry weight sensor 100 and signals from flow meters and controls of the cement metering valve 24 and/or the mix water sensor 32. Using these signals, the controller 70 then adjusts the delivery of cement and mix water to achieve the proper cement slurry density. The control depends on the particulars of the cementing job, such as required density, yield, water requirements, water specific gravity, etc., and the controller 70 uses this information to calculate the delivery of the dry bulk cement. Although not specifically detailed here, it will be appreciated that the controller 70 controls various valves, meters, and the like of the system 12 using hydraulics, electronic signals, or other forms of activation known and used in the art.

Measuring fluid velocity and phase measurements are not the direct intention of the system 10. Instead, the system 10 seeks to minimize the gas phase by measuring under an applied pressure to the process fluid. The system 10 then makes the velocity measurement unnecessary by minimizing the distance between the sensor locations and maintaining a constant velocity through the sensor 100. The constant velocity can be maintained by a dedicated pump feeding fluid to the density loop. As noted above, the recirculation pump 60b feeds the mixer. In addition to this arrangement, the disclosed system 10 can use a density recirculation pump feeding fluid to the density loop. For instance, a dedicated pump can be used on the recirculation loop, such as at 67 on the conduit 66 or elsewhere. This dedicated pump 67 can be used to maintain a constant velocity of the recirculated slurry passing through known volume and the sensor 100, thus simplifying the monitoring and control by the controller 70 as the system 10 operates.

As noted above, the direct slurry weight sensor 100 installs in the recirculation loop. Rather than interpolating density or making several mathematical assumptions to calculate density based on average flow rate as historically done, the direct slurry weight sensor 100 directly measures a weight of a known volume of the slurry.

Because the weight of the slurry is directly measured, particle sizes and composition of the slurry do not adversely affect the measurements, and only their weight contribution has significance, which is the goal of the measurement.

As noted previously, the Coriolis technology loses accuracy as more air is entrained or as particles of significantly different specific gravity are utilized together in the slurry. Likewise, the nuclear sensor loses accuracy as more air is entrained and is dependent on characterizing the absorption of each slurry material mix used. Such is not the case with the direct slurry weight sensor 100 of the present disclosure. As an additional advantage, the need for a nuclear source sensor is eliminated, which enables the equipment of the disclosed sensor 100 to be more mobile and less regulated and reduces operating expenses.

The direct slurry weight sensor 100 operates as a density sensor to directly measure the weight of a known vertical volume V of the cement slurry. To do this, the sensor 100 measures a differential pressure ($P_1-P_2$) between two measurement points vertically displaced by a distance L, and the sensor 100 also measures a bulk velocity of the slurry so that the slurry's density can be calculated. The sensor 100 includes any suitable arrangement of sensing elements to measure differential pressure and the bulk velocity of the slurry, and these sensing elements can be incorporated together into one or more packages or units used to make the density measurement.

The direct slurry weight sensor 100 can also include another sensor to measure the speed of sound in the mixture, which can be used in determining the volumetric phase fractions for each phase in the mixture based on the differential pressure, bulk velocity, and speed of sound in the mixture. Overall, components of the direct slurry weight sensor 100 can be similar to those disclosed in commonly-owned U.S. Pat. No. 7,281,415, which is incorporated herein by reference in its entirety.

Because the sensor 100 is arranged vertically along the conduit 66, a small amount of pressure from the column of slurry is applied to the sensor's volume. Thus, any minute amount of entrained air in the slurry will be compressed in the volume, which reduces its impact on the sample's volume. In this way, the disclosed sensor 100 seeks to minimize one of the phases (i.e., any gas phase in the slurry) so the disclosed sensor 100 can monitor the density. Additionally, frictional pressure losses are preferably reduced in the conduit 66 by minimizing the distance between the sensing locations on the sensor 100. This can help ensure that similar pressure is applied to all sensors, thus removing this variable in the differential calculation.

Although the sensor 100 is shown disposed on the separate conduit 66 from the recirculation conduit 64 and discharging to the mix tank 40, the disclosed sensor 100 can be installed on a vertical portion of the recirculation conduit 64, provided that the sensor 100 does not restrict recirculation of the slurry. Therefore, the separate conduit 66 may not be needed. Yet, the separate conduit 66 may be preferred because the known volume for the sensor 100 can be properly selected, the separate conduit 66 can be more readily arranged vertically, and flow into the separate conduit 66 can be controlled by a valve 65 or the like.

Moreover, although the system 10 has the recirculation path of the conduit 64 recirculate back to the mixer 20, this may not be strictly necessary in some implementations. Instead, recirculation may not be made to the mixer 20, and recirculated slurry may only be communicated through vertical conduit 66 to the sensor 100 and the mixer tank 40. As will be appreciated, these and other alternative arrangements of the disclosed system 10 can be used for a given implementation.

Figure 2:
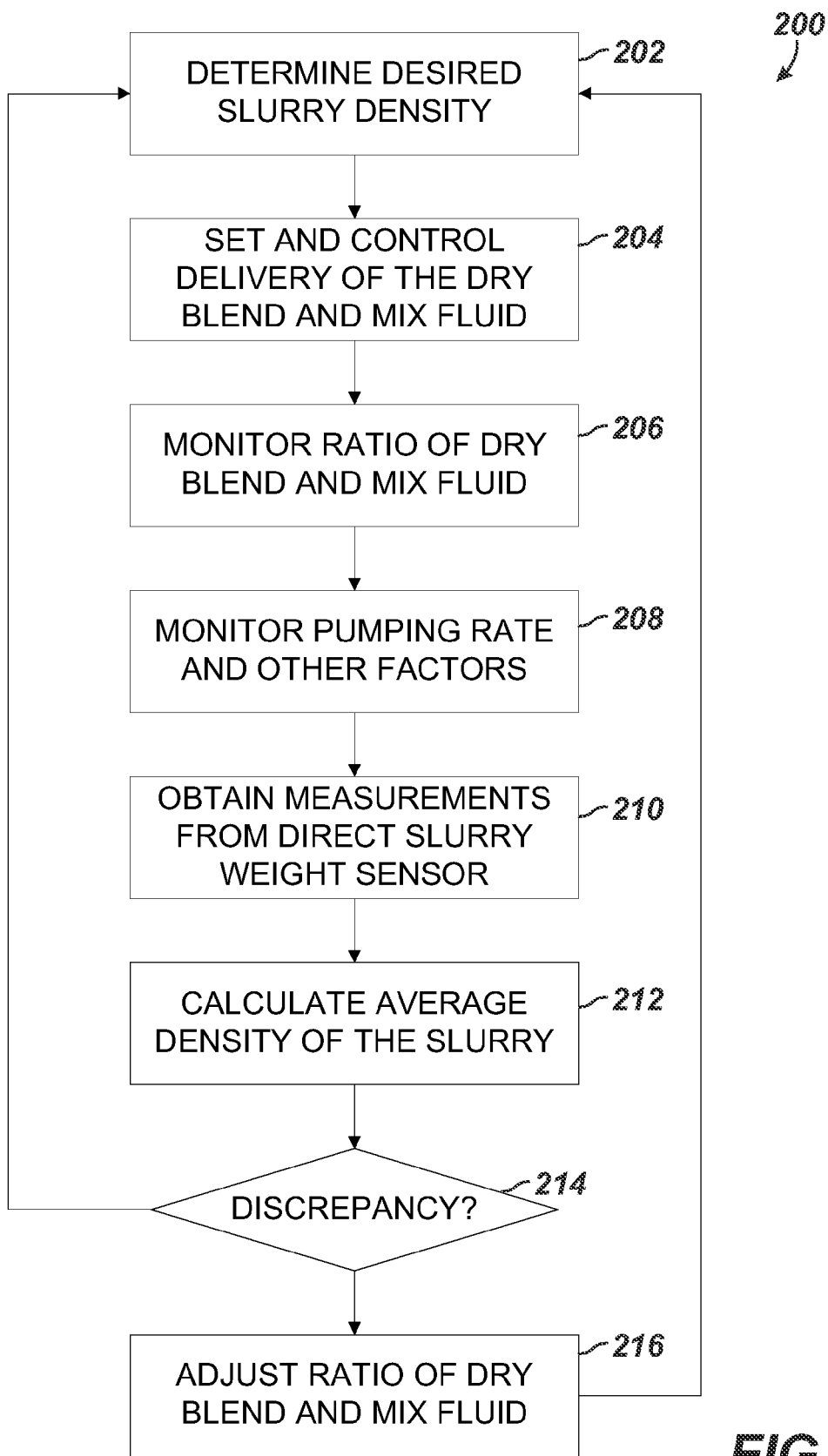
FIG. 2 illustrates a flow chart of a slurry mixing process using the direct slurry weight sensor of the present disclosure.

FIG. 2 shows a flow chart of a mixing process 200 using the disclosed system (10) and direct slurry weight sensor (100). The mixing process 200 as described here can pertain to mixing of a cement slurry, but could apply equally to the mixing of other slurries, such as fracing or downhole treatment slurries.

The controller (70) determines a desired slurry density $\rho_o$ during the operation (Block 202). Depending on the application, the desired slurry density $\rho_o$ can be dictated by a number of factors, such as type of slurry, additives, depth, downhole pressure, temperature, current zone of the formation, etc. Delivery of the dry blend and the mix fluid is then set and controlled to meet the desired slurry density $\rho_o$ (Block 204). For cementing operations, the dry blend includes the bulk dry cement, and the mix fluid is typically water, but other operations would use other materials.

As the mixing proceeds, the controller (70) monitors the ratio of dry blend and mix fluid for the slurry (Block 206) and monitors the pumping rate and other factors for desired delivery of the slurry (Block 208). Adjusting the ratio of dry blend and mix fluid primarily controls the slurry's density. If the feed of the dry blend is constant and the feed of mix fluid is too low, then the density of the slurry would be too high. This may result in an insufficient volume of slurry delivered to the well. Additionally, the slurry's viscosity would be too high so that excessive pumping pressures may cause a loss of circulation. The reverse would be the case if the feed of the mix fluid is too high compared to the dry blend's feed.

As the operation proceeds, a portion of the resulting slurry recirculates back to the vertical conduit (66) off the recirculation conduit (64). As the diverted slurry flows past the known volume V of the direct slurry weight sensor (100), the controller (70) obtains the measured pressures $P_1$ and $P_2$ and the bulk velocity $v_{slurry}$, of the slurry from the direct slurry weight sensor (100) (Block 210). The measured data can be obtained at any desirable interval and can be communicated in any of a number of ways to the controller (70).

Using the measured data and the equations noted below, the controller (70) then calculates the average density $\rho_{slurry}$ of the slurry (Block 212). Again, this calculation can be performed at any desirable interval suited for controlling the operation. The controller (70) then compares the calculated average density $\rho_{slurry}$ to the desired slurry density $\rho_o$ and determines if a discrepancy exits (Decision 214). (Any perceived discrepancy may be based on a suitable threshold for the type of slurry and the density levels involved.) If a significant discrepancy exists, then the controller (70) adjusts the ratio of the dry blend and the mix fluid (Block 216). Of course, the controller (70) also continuously monitors other sensors, flow meters, pumps, etc. in the system (10) and makes appropriate adjustments to pump rates, valves, etc. to control the mixing process.

FIG. 3 shows one exemplary embodiment of the direct slurry weight sensor 100 having one sensor arrangement for measuring differential pressure and bulk velocity as well as the optional speed of sound of the slurry. As shown, the sensor 100 installs on a pipe or conduit 110 having flanges. This pipe 110 disposes vertically along the vertical conduit (66) extending from the recirculation conduit (64) of the disclosed system (10). (See FIG. 1.)

In the arrangement of FIG. 3, the sensor 100 includes two pressure sensors 104 and 106 disposed on the pipe 110 and displaced vertically by a displacement L. These sensors 104 and 106 measure the slurry's pressure at two measurement points on the pipe 110 so a differential pressure ($P_1-P_2$) can be determined. The vertical displacement L corresponds to the vertical distance between the sensors 104 and 106 on the pipe 110, although the vertical displacement may be trigonometrically determined if the pipe 110 is not strictly vertical. In general, the displacement L is chosen to provide a hydrostatic pressure difference large enough to overcome accuracy and resolution limitations of the pressure sensors 104 and 106.

The direct slurry weight sensor 100 also includes a sensor 103 for measuring bulk velocity ($v_{mix}$) and a sensor 105 for measuring speed of sound ($\alpha_{mix}$) of the slurry. As illustrated, the sensors 103 and 105 can be integrated into a single assembly 102. A temperature sensor 107 may also be provided to measure temperature, which can be used for variables of interest that depend on temperature. For example, the speed of sound and density variables are functions of temperature and pressure, which may be determined based on measurements from the pressure sensor 106 and the temperature sensor 107. The sensor 100 can also have other arrangements of these sensor elements at different locations along the pipe 110 and the flow of the slurry.

As slurry flows vertically up the pipe 110, the pressure sensors 104 and 106 measure the pressure differential of the slurry between the measurement points. The velocity sensor 103 also measures the bulk velocity of the slurry flowing through the pipe 110, and the speed of sound sensor 105 can measure the speed of sound in the slurry. Temperature may also be measured by the temperature sensor 107. The measurements from these sensors 103-107 are used by the controller (70; FIG. 1) to calculate the density of the slurry as well as other desirable variables.

The pressure sensors 104 and 106 can be any suitable type of pressure sensor, such as strain sensors, quartz sensors, piezoelectric sensors, etc. The pressure sensors 104 and 106 can also be fiber optic sensors using strain-sensitive Bragg gratings, such disclosed in U.S. Pat. No. 5,892,860, which is incorporated herein by reference. The velocity sensor 103 can be similar to those described in commonly-owned U.S. Pat. No. 6,463,813, which is incorporated herein by reference. Finally, the velocity sensor 103 and speed of sound sensor 105 may be similar to those described in commonly-owned U.S. Pat. No. 6,354,147, which is incorporated herein by reference. These and other types of sensors known and used in the art can be used.

FIG. 4 shows an installation of the direct slurry weight sensor 100. Here, the sensor 100 has a main sensing unit 120 coupled to a pipe 110 with a bracket 122. This pipe 110 has flanges and couples to the vertical conduit (66; FIG. 1) of the disclosed system. The sensing unit 120 houses the various pressure, bulk velocity, and speed of sound sensors noted herein. Diaphragm seals 130 and 140 disposed on the pipe 110 are exposed to the pipe's known volume between measurement points separated by vertical displacement L. Thus, the pipe's known volume is characterized as ($V = \pi r^2 L$). Capillary tubes 132 and 142 extend from the diaphragm seals 130 and 140 to the pressure sensing elements (not shown) housed in the sensing unit 120. A transmitter 125 on the unit 120 can transmit measured data to the controller (70; FIG. 1) for processing.

With any of the sensor arrangements of FIGS. 3-4, the controller 70 determines a density of the slurry passing through the pipe 110 based on the differential pressure and the bulk velocity of the slurry measured by the sensor 100. If desired, volumetric phase fractions may also be determined based on the determined slurry density and measured speed of sound in the slurry.

Looking at the arrangement of FIG. 4, for example, the density ($\rho_{slurry}$) of the slurry is calculated using the measured differential pressure ($\Delta p$) between $P_1$ and $P_2$, and the measured bulk velocity ($v_{mix}$) of the slurry in the pipe's known volume ($V = \pi r^2 L$). The average density ($\rho_{slurry}$) can be calculated using the following equation:

$$\rho_{slurry} = \frac{p_1 - p_2}{gh + \frac{Lfv_{slurry}^2}{4r}}$$

As the cementing operation proceeds, the controller 70 calculates this slurry density ($\rho_{slurry}$) and uses it to control the density of the cement slurry being output by the system (10) according to the desired results as disclosed previously.

Notably, the average slurry density ($\rho_{slurry}$) may be determined independent of the magnitude of slippage between the different individual phases of the slurry in the pipe 110. In the equation, the differential pressure ($P_1$-$P_2$) as well as the bulk velocity $v_{mix}$ are measured using the sensor 100. Frictional pressure loss is estimated using the measured bulk velocity of the mixture and a well-known frictional loss equation in which L is the length between the two measurement points, f is the friction factor (e.g., a Moody friction factor calculated using known roughness of an inner surface of the pipe, etc.), and r is the inner radius of the pipe 110.

Because the sensor 100 is arranged vertically (or at least approximately), a small amount of pressure is applied to the sensor's volume due to gravity so any minute amount of entrained air will be compressed in the volume. This can reduce the entrained air's impact on the sample volume and calculations. Moreover, minimizing the displacement L between the sensing locations on the sensor 100 can reduce frictional pressure losses and help ensure the same process pressure is applied to all sensors, thus removing this variable in the differential calculation.

If desired, the volumetric phase fraction can also be calculated. To determine this, the controller 70 measures pressure and temperature of the slurry and calculates the density $\rho_{calc}$ and speed of sound $\alpha_{calc}$ for each phase using the measured pressure and temperature. After calculating the average density $\rho_{slurry}$ with the previous equation from the measured pressure differential ($P_1$-$P_2$) and bulk velocity $v_{slurry}$, the controller 70 can calculate the volumetric phase fractions for each phase using the equation's density $\rho_{slurry}$ and measured speed of sound $\alpha_{slurry}$ and using the calculated density $\rho_{calc}$ and speed of sound $\alpha_{calc}$ for each phase.

As noted previously, the techniques of the present disclosure seek to minimize one of the phases, namely any air in the slurry. Therefore, calculating the volumetric phase fraction for gas (i.e., air) in the slurry can be used to verify that as little air as possible is entrained in the slurry or for other purposes. Equations for calculating the volumetric phase fractions are disclosed in the incorporated U.S. Pat. No. 7,281,415, which can be modified for the particular slurry of interest.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A slurry mixing system of a well operation, comprising:
   a mixer mixing a dry blend and a mix fluid into a slurry;
   a first pump disposed downstream of the mixer,
   flow equipment delivering a first portion of the slurry from the first pump for the well operation, circulating a second portion of the slurry from the first pump back to the mixer for mixing, and circulating a third portion of the slurry from the first pump for sensing;

a slurry sensor disposed in fluid communication with the third portion of the slurry, the slurry sensor measuring a pressure differential of the slurry between at least two vertical measurement points of a known volume, the flow equipment circulating the third portion of the slurry to a point downstream of the mixer and upstream of the first pump; and a controller operatively coupled to the slurry sensor, the controller obtaining the measured pressure differential and obtaining a velocity of the third portion of the slurry, the controller calculating a density of the slurry therefrom.

2. The system of claim 1, further comprising the dry blend and the mix fluid as part of the system, wherein the dry blend comprises a cement or a fracking material, and wherein the mix fluid comprises water.

3. The system of claim 1, wherein the mixer comprises at least one jet supplying the mix fluid to the dry blend.

4. The system of claim 1, wherein the controller monitors a ratio of the dry blend and the mix fluid delivered to the mixer and adjusts the ratio based on the calculated density of the slurry.

5. The system of claim 1, further comprising:
a dry blend sensor operatively coupled to the controller and measuring the dry blend delivered to the mixer; and
a fluid sensor operatively coupled to the controller and measuring the mix fluid delivered to the mixer.

6. The system of claim 1, comprising at least one tank downstream of the mixer and upstream of the first pump, the at least one tank having at least one agitator agitating the slurry.

7. The system of claim 6, wherein the at least one tank comprises:
a first tank agitating the mixing of the slurry from the mixer; and
a second tank averaging the slurry from the first tank.

8. The system of claim 1, wherein the flow equipment comprises a second pump maintaining the velocity of the third portion of the slurry constant passing through the slurry sensor.

9. The system of claim 8, comprising at least one tank disposed at the point downstream of the mixer and upstream of the first pump; and wherein the second pump discharges the third portion of the slurry to the at least one tank.

10. The system of claim 1, wherein the slurry sensor comprises a conduit arranged vertically and having the known volume between first and second vertical locations as the at least two vertical measurement points.

11. The system of claim 10, wherein the slurry sensor comprises first and second pressure sensors sensing first and second pressures for the pressure differential respectively at the first and second vertical locations of the known volume.

12. The system of claim 11, wherein the first and second pressure sensors each comprise:
a sensing element for sensing pressure;
a diaphragm disposed at the vertical location and in communication with the known volume; and
a capillary communicating the sensing element with the diaphragm.

13. The system of claim 1, wherein the slurry sensor comprises a velocity sensor sensing the velocity of the recirculated slurry.

14. The system of claim 1, wherein the slurry sensor comprise a speed of sound sensor measuring a speed of sound in the slurry; and wherein the controller determines volumetric phase fractions for each phase in the slurry based on the pressure differential, the velocity, and the speed of sound in the slurry.

15. A slurry mixing method of a well operation, comprising:
mixing a dry blend and a mix fluid into a slurry with a mixer;
pumping the slurry with a first pump disposed downstream of the mixer;
delivering, with flow equipment, a first portion of the slurry from the first pump for the well operation;
circulating, with the flow equipment, a second portion of the slurry from the first pump back to the mixer for mixing and a third portion of the slurry from the first pump for sensing;
measuring, with a slurry sensor disposed in fluid communication with the third portion of the slurry, a pressure differential of the slurry between at least two verticals measurements points of a known volume;
circulating, with the flow equipment, the third portion of the slurry to a point downstream of the mixer and upstream of the first pump
obtaining a velocity of the third portion of the slurry; and
calculating a slurry density from the measured pressure differential and the obtained velocity.

16. The method of claim 15, wherein the dry blend comprises a cement or a fracking material, and wherein the mix fluid comprises water.

17. The method of claim 15, further comprising:
monitoring a ratio of the dry blend and the mix fluid; and
adjusting the ratio based on the calculated slurry density.

18. The method of claim 15, further comprising maintaining the velocity of the third portion of the slurry constant passing through the known volume by pumping the third portion of the slurry with a second pump.

19. The method of claim 15, wherein measuring the pressure differential comprises sensing first and second pressures for the pressure differential respectively at first and second vertical locations as the at least two measurement points of the known volume.

20. The method of claim 15, wherein obtaining the velocity of the third portion of the slurry comprise measuring the velocity with a velocity sensor.

21. The method of claim 15, further comprising:
measuring a speed of sound in the third portion of the slurry; and
determining volumetric phase fractions for each phase in the third portion of the slurry based on the pressure differential, the velocity, and the speed of sound in the recirculated slurry.

22. The method of claim 15, wherein circulating, with the flow equipment, the second portion of the slurry from the first pump back to the mixer for remixing comprises circulating the second portion of the slurry to at least one jet mixing the dry blend and the mix fluid.

23. The method of claim 15, wherein recirculating the third portion of the slurry to the point downstream of the mixer and upstream of the first pump comprises recirculating the third portion of the slurry to at least one tank disposed at the point downstream of the mixer and upstream of the first pump.

24. The system of claim 1, wherein the flow equipment comprises:
first piping in communication between the first pump and the mixer and delivering the second portion of the slurry; and second piping in communication between the first pump and the slurry sensor and delivering the third portion of the slurry.

25. The system of claim 24, wherein the flow equipment comprises a second pump in communication with the second piping and maintaining the velocity of the third portion of the slurry constant passing through the slurry sensor.

26. The system of claim 24, comprising at least one tank disposed at the point downstream of the mixer and upstream of the first pump, the second piping delivering the third portion of the slurry to the at least one tank.

27. The system of claim 1, wherein the flow equipment comprises:
   a first valve in communication between the first pump and the mixer and delivering the second portion of the slurry; and
   a second valve in communication between the first valve and the slurry sensor and delivering the third portion of the slurry from the second portion of the slurry.

* * * * *